US009130981B2

(12) United States Patent
Yi

(10) Patent No.: US 9,130,981 B2
(45) Date of Patent: Sep. 8, 2015

(54) METHOD AND APPARATUS FOR VISUALIZING NETWORK SECURITY STATE

(71) Applicant: Electronics and Telecommunications Research Institute, Daejeon (KR)

(72) Inventor: Sungwon Yi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 153 days.

(21) Appl. No.: 13/721,236

(22) Filed: Dec. 20, 2012

(65) Prior Publication Data

US 2014/0013432 A1    Jan. 9, 2014

(30) Foreign Application Priority Data

Jul. 9, 2012    (KR) ........................ 10-2012-0074733

(51) Int. Cl.
H04L 29/06    (2006.01)
(52) U.S. Cl.
CPC ................... H04L 63/1416 (2013.01)
(58) Field of Classification Search
CPC ....... G06F 21/55; G06F 21/552; G06F 21/00; H04L 63/1416; H04L 63/1425; H04L 63/1443; H04L 63/145; H04L 63/10; H04L 63/20; G06N 7/005; G06T 17/00; H04W 12/00
USPC .......................................................... 726/23
See application file for complete search history.

(56) References Cited

U.S. PATENT DOCUMENTS

| 7,047,423 | B1 | 5/2006 | Maloney et al. | |
| 7,607,169 | B1 * | 10/2009 | Njemanze et al. | 726/22 |
| 2003/0140250 | A1 * | 7/2003 | Taninaka et al. | 713/201 |
| 2010/0030892 | A1 * | 2/2010 | Jeong et al. | 709/224 |
| 2010/0100619 | A1 * | 4/2010 | Chang et al. | 709/224 |
| 2010/0154057 | A1 * | 6/2010 | Ko et al. | 726/23 |
| 2010/0162392 | A1 * | 6/2010 | Jeong et al. | 726/22 |
| 2012/0137361 | A1 | 5/2012 | Yi et al. | |
| 2012/0221589 | A1 * | 8/2012 | Shahar et al. | 707/758 |

FOREIGN PATENT DOCUMENTS

KR  10-2008-0050919  6/2008
KR  10-2012-0057066  6/2012

OTHER PUBLICATIONS (NPL Snapshot).*
Daisuke Inoue et al., "nicter: An Incident Analysis System toward Binding Network Monitoring with Malware Analysis", *WOMBAT Workshop on Information Security Threats Data Collection and Sharing*, IEEE Computer Society, Apr. 2008, pp. 58-66.
Electronics and Telecommunications Research Institute, "2012 Total Security Technology Solution Expo", Mar. 14-16, 2012, in KINTEX 1, 2 Hall of Republic of Korea, pp. 1-4.

* cited by examiner

Primary Examiner — Matthew Smithers
(74) Attorney, Agent, or Firm — Staas & Halsey LLP

(57) ABSTRACT

A network security state visualization scheme is suitable for collecting security events existing in a network, analyzing the security events, categorizing and contracting the analyzed security events into attack state information, and visualizing the attack state information as a three-dimensional (3D) screen to display the visualized information on a display panel. Unlike the related art where security events are expressed from the viewpoint of IPs, this scheme normalizes collected security event information, analyzes the normalized information, categorizes and contracts the analyzed information into the attack state information, extracts visualization target data, visualizes the visualization target data as the 3D screen, and displays the visualized 3D screen on the display panel.

14 Claims, 4 Drawing Sheets

302: ATTACK INFORMATION DISPLAY REGION
304: DATA UPDATE INDICATOR
306: ELECTRONIC MAP DISPLAY REGION
308: DETAILED INFORMATION DISPLAY REGION
310: CUMULATIVE INFORMATION DISPLAY REGION

METHOD AND APPARATUS FOR VISUALIZING NETWORK SECURITY STATE

RELATED APPLICATION(S)

This application claims the benefit of Korean Patent Application No. 10-2012-0074733, filed on Jul. 9, 2012, which is hereby incorporated by references as if fully set forth herein.

FIELD OF THE INVENTION

The present invention relates to a technology of visualizing a network security state, and more particularly, to a method and apparatus for visualizing a network security state, which is suitable for collecting security events existing in a network, analyzing the security events, categorizing and contracting the analyzed security events into attack state information, and visualizing the attack state information as a three-dimensional (3D) screen to display the visualized information on a display panel.

BACKGROUND OF THE INVENTION

As it is well-known, since a plurality of computers or computing systems is connected to each other through various networks such as Internet, they can be exposed to attacks or intrusions conducted through a network or information system. Therefore, protecting the computers or computing systems from the attacks or intrusions has grown in importance.

As attacks or intrusions, there are computer viruses, computer worms, system component changes, service denial attacks, and additionally, misapplications of legal computer system properties.

To prevent such network attacks, academic world and security enterprises provide firewalls, intrusion detection systems (IDSs), intrusion prevention systems (IPSs), and network security methods using a technology of virtual private network (VPN).

Generally, as methods of recognizing a network security state, there are a method based on a traffic pattern occurring in a network and a method of using security events occurring from security systems installed on a network.

However, in the case of the method based on a traffic pattern, when an amount of the traffic pattern exceeds a predetermined value, it is considered that stability of the network is affected. Accordingly, there is a restriction on analyzing an abnormal state by recognizing a correlation between generated traffic properties.

In the case of the method based on security events occurring from security systems, since a security state of the network was conventionally expressed in the form of a line using Source IP, Source Port, Destination IP, Destination Port, and Protocol a security event of the whole network was expressed from the viewpoint of IPs.

The security visualization based on IPs can provide detailed information for each IP, but it has a fundamental problem that it is difficult to recognize a state of each location of an organization to be controlled, a state of each security system, a state of each destination to be attacked, and so on. In addition, when a security manager takes a measure with regards to the security state, the response cannot be effectively conducted since the security manager should cope with each IP.

SUMMARY OF THE INVENTION

It is, therefore, an object of the present invention to provide a scheme for expressing a security state of a network in real time by collecting network events transmitted from a network control or security system and visualizing a dome structure, which expresses details of attacks, and a security state for each service provider or each detection equipment by regional groups to be attacked as a three-dimensional (3D) screen using a 3D map.

In accordance with an aspect of the present invention, there is provided a method for visualizing a network security state, the method including collecting security event information from a network security system, analyzing the security event information and extracting visualization target data corresponding to the security event information, and visualizing the visualization target data as a three-dimensional (3D) screen, and displaying the 3D screen on a display panel.

Extracting the visualization target data may include normalizing the security event information using pre-defined standard formats and standard codes, analyzing the normalized security event information, and categorizing and contracting the analyzed security event information to attack state information so as to extract the attack state information as the visualization target data.

The visualization target data may include the attack state information and additional information for an attack state, wherein the additional information may include cumulative information and detailed information for the attack state, and wherein the cumulative information may be accumulated by regions where attacks took place and by detection equipments, and displayed in the form of a bar graph expressing the cumulative information that is classified into an offensive side and a damaged side.

The detailed information may include data that is newly updated according to the movement of a data update indicator, the newly updated data being expressed in the form of a text box, and the detailed information may be displayed in the form of a pop-up when a mouse event is generated.

The attack state information may be displayed in the form of a structure that expresses an attack type and an attack target service port, categorized and contracted when a predetermined critical value applied thereto is greater than a predetermined reference value, and determined according to one of attack types, attack codes, attack destination, attack cycles, detection equipments, regions where attacks took place, service ports, attack times by equipments, the number of packets, attack volumes, and a combination thereof.

In accordance with another aspect of the present invention, there is provided an apparatus for visualizing a network security state, the apparatus including a security event collection block configured to collect security event information from a network security system, a security event normalization block configured to normalize the security event information using pre-defined standard formats and standard codes, a security event contraction block configured to analyze the normalized security event information and categorize and contract the analyzed security event information to attack state information, and a visualization execution block configured to extract the attack state information as visualization target data, visualize the visualization target data as a three-dimensional (3D) screen, and display the 3D screen on a display panel.

In accordance with embodiments of the present invention, a security manager can easily recognize in real time security states, which are divided by departments, regions where an attack took place, and security equipments of its organization, and cope with an attack by collecting network events transmitted from a network control or security system, visualizing a dome structure, which expresses details of attacks, and a security state for each service provider or each detection equipment by regional groups to be attacked as a three-dimensional (3D) screen, and expressing the visualized security state in real time.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Unlike the related art where a security event of a network is expressed from the viewpoint of IP, a technical issue of the present invention is to normalize security event information collected from a network security system, to analyze the normalized security event information, to categorize and contract the analyzed security event information into attack state information, to extract visualization target data from the attack state information, to visualize the extracted visualization target data as a 3D screen, and to display the visualized 3D screen on a display panel. As a result, it is possible to effectively improve a problem of a conventional scheme through the use of a technical scheme of the present invention.

Hereinafter, embodiments of the present invention will be described in detail with reference to the accompanying drawings so that they can be readily implemented by those skilled in the art.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Figure 1:
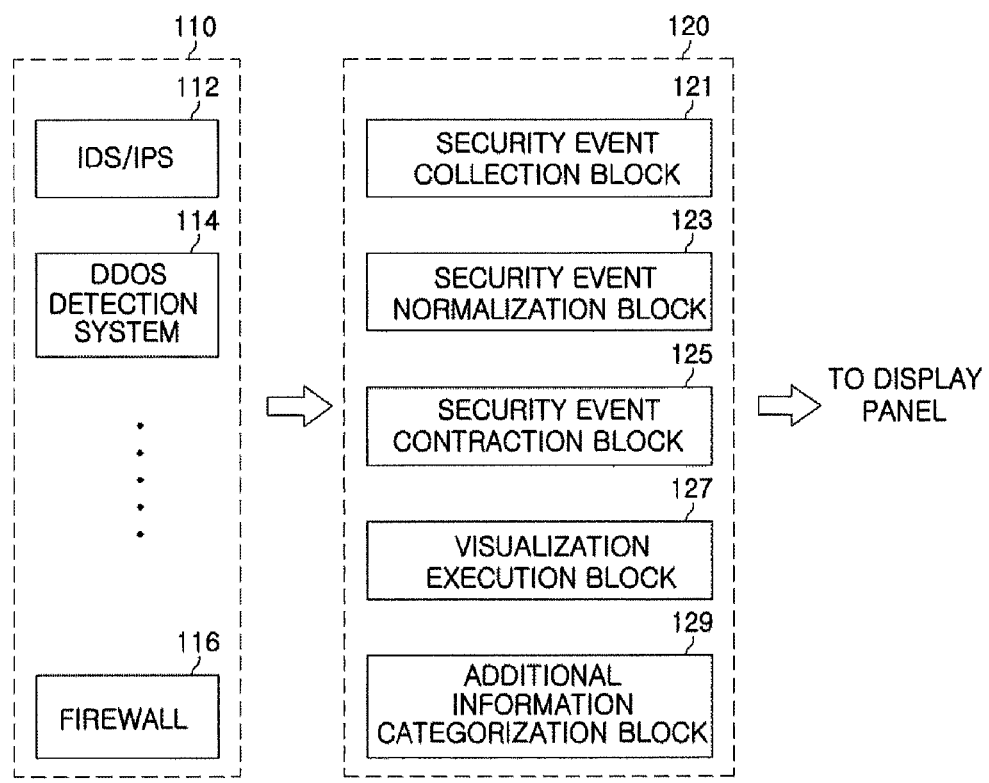
FIG. 1 is a block diagram illustrating an apparatus for visualizing a network security state in accordance with an embodiment of the present invention.

FIG. 1 is a block diagram illustrating an apparatus for visualizing a network security state in accordance with an embodiment of the present invention. The apparatus for visualizing a network security state 120 may include a security event collection block 121, a security event normalization block 123, a security event contraction block 125, a visualization execution block 127, and an additional information categorization block 129. In FIG. 1, a network security system 110 may include information detection system/information prevention system (IDS/IPS) 112, a distributed denial of service (DDoS) detection system 114, and a firewall 116.

The security event collection block 121 collects security event information from the network security system 110. For this purpose, the security event collection block 121 real-time monitors security event logs of respective network security systems such as the IDS/IPS 112, the DDoS detection system 114, and the firewall 116, dispersing as shown in FIG. 1, and periodically integrates the security event logs at a regular time interval to collect the security event information.

The security event normalization block 123 normalizes the security event information collected by the security event collection block 121 using pre-defined standard formats and standard codes. The security event information may include an attack type, an attack code, an attack destination, an attack cycle, a type of a detection equipment, a region where an attack took place, a service port, attack times by equipments, the number of packets, an attack volume, and so on.

A used code and a data format generated from a network security system may be different depending on manufacturers. For instance, while an IDS produced by an manufacturer "A" expresses a SYNFlooding attack as '1', an IDS produced by a manufacturer "B" may express the SYNFlooding attack as 'SF'. Accordingly, in accordance with an embodiment of the present invention, the normalization is performed on the security event information to define unified codes and express the security event information, which is differently expressed, using the unified codes.

The security event contraction block 125 analyzes normalized security event information that is obtained by the normalization performed by the security event normalization block 123 and stored in a memory region (not shown), and categorizes and contracts the analyzed security event information to attack state information.

That is, the security event contraction block 125 applies a predetermined critical value to the normalized security event information, and categorizes and contracts the normalized security event information to the attack state information if the predetermined critical value is greater than a predetermined reference value. Herein, the categorization and contraction of the normalized security event information is performed by categorizing the normalized security event information according to, e.g., attack types, attack codes, attack destination, attack cycles, detection equipments, regions where attacks took place, service ports, attack times by equipments, the number of packets, attack volumes, incoming outgoing IDs, the same time zone, and so on. The security event information that is categorized and contracted as shown above may be accumulated to the attack state information and additional information and stored in the memory region. The additional information may include cumulative information and detailed information for an attack state. The cumulative information may be summed up by regions where attacks took place and by detection equipments.

The security event information is contracted to prevent a problem from occurring in a visualization speed, i.e., real time visualization, during a process to be described later since, if all of the collected security event information is visualized, an amount of data to be expressed becomes enormous. In addition, if the collected security event information is not contracted, a visualization screen becomes very complicated, so that it brings a visual confusion to a security manager.

In the light of the above problems, the visualization may be performed on security event information corresponding to an amount of attacks that is greater than a certain value, for example 1 Gbps, or security event information corresponding to the number of packets used for attacks, which is greater than a certain threshold value, for example 100,000 packets per minute.

The visualization execution block 127 extracts the categorized and contracted security event information, which is stored in the memory region, as visualization target data, visualizes the visualization target data as a 3D screen, and displays the 3D screen on a display panel (not shown).

The additional information categorization block 129 categorizes detailed information and cumulative information for an attack event of the attack state information into additional information, stores the additional information in the memory region, extracts the additional information when the visualization is executed, and transfers the extracted additional information to the visualization execution block 127.

Figure 3:
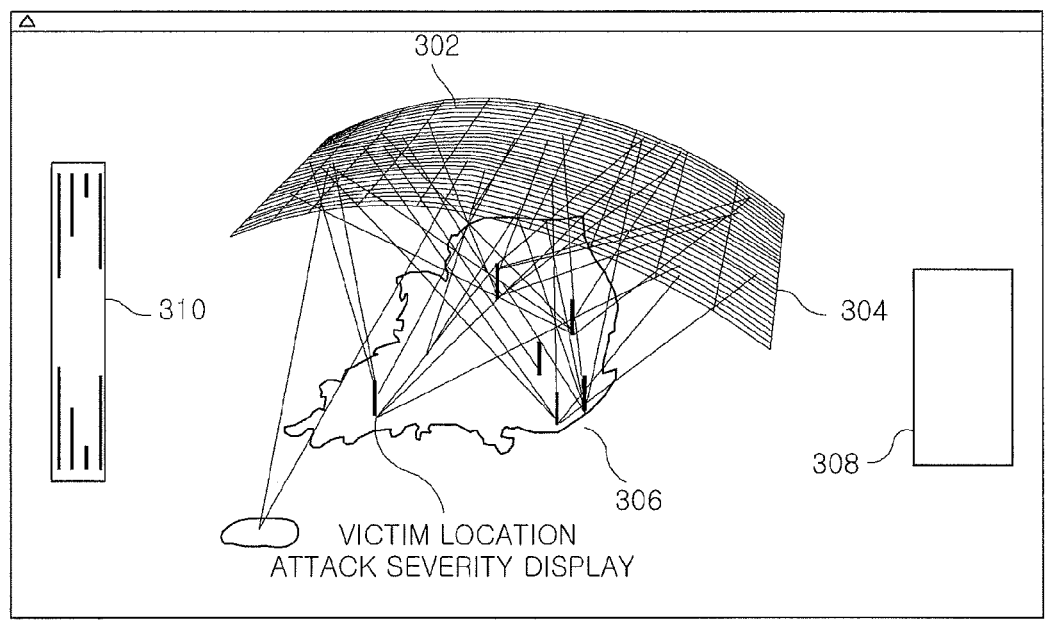
FIG. 3 illustrates a visualization screen implemented according to an embodiment of the present invention.
Figure 4:
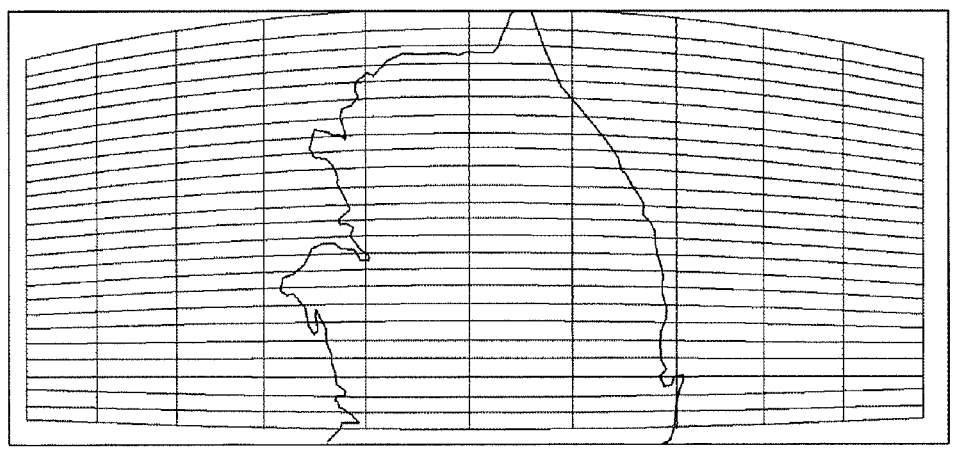
FIG. 4 illustrates a screen of an attack information display region.

Herein, as illustrated in FIG. 3, the 3D visualization screen may include an attack information display region 302, a data update indicator 304, an electronic map display region 306, a region for displaying detailed information of additional information, i.e., a detailed information display region 308, and a region for displaying cumulative information of the additional information, i.e., a cumulative information display region 310.

Attack state information displayed in the attack information display region 302 may be displayed as a structure having a dome shape, which expresses an attack type and a service port to be attacked. As an example, in the structure, a vertical axis represents the attack type, and a horizontal axis represents the service port to be attacked. The data updating in the attack information display region 302 may be performed at a time by attack types or service ports. As an example, the attack state information may be updated as the data update indicator 304 moves from the lower left corner to the upper right corner of the attack information display region 302. In case that there is new data or updated data, the data may be connected to each other and displayed as a line moving to an attack region.

The data update indicator 304 represents a point showing the movement such as scanning in typical radar. In case of visualizing a security state, lots of data is displayed as a single screen, and the data should be frequently updated to reflect the security state on the screen in real time. However, frequently updating lots of data increases a load of a system, which affects performance of the system. Therefore, the data update indicator 304 plays a role of reflecting the updated data on the screen as periodically scanning from start to finish of the dome structure like a point of the radar. This is for reducing an amount of data to be read out at a time and for allowing a time taken in reflecting the updated data on the screen to be in a predetermined range. That is, in accordance with an embodiment of the present invention, data for a certain attack and port is periodically updated according to the above scheme.

In the detailed information display region 308, contents of newly updated data may be displayed in the form of a text box according to the movement of the data update indicator 304. The detailed information may be displayed in the form of a pop-up on the display panel, e.g., when the security manager generates a mouse event.

The cumulative information displayed in the cumulative information display region 310 may be accumulated by regions where attacks took place and by detection equipments, and displayed in the form of a bar graph expressing the cumulative information that is classified into an offensive side and a damaged side.

Hereinafter, a sequence of processes of providing a visualization service for a network security state will be described using the inventive apparatus for visualizing a network security state.

Figure 2:
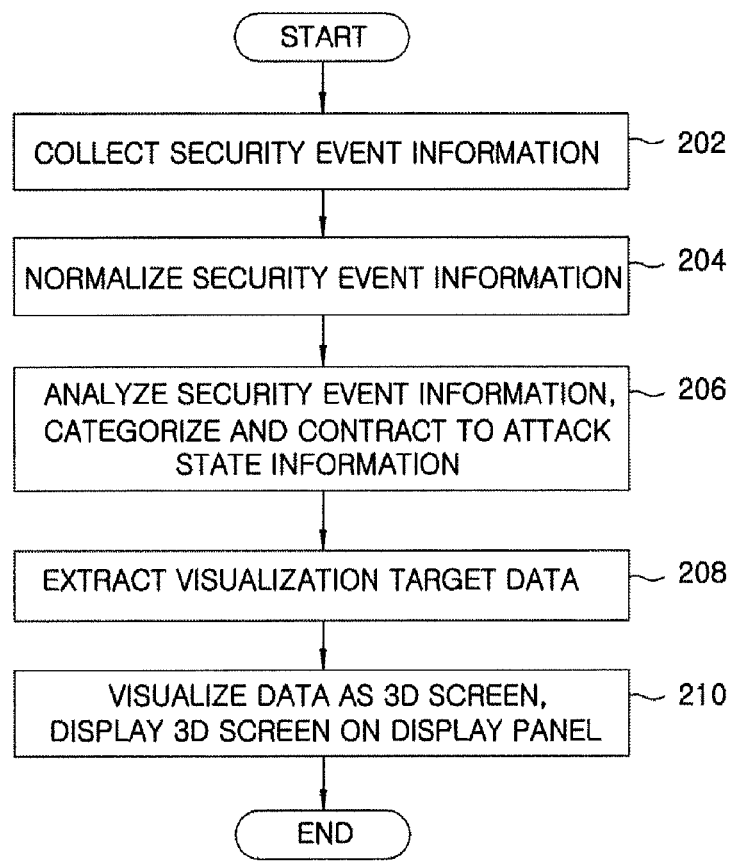
FIG. 2 is a flowchart illustrating a method of visualizing and displaying results obtained by collecting and analyzing security event information in accordance with an embodiment of the present invention.

FIG. 2 is a flowchart illustrating a method of visualizing and displaying results obtained by collecting and analyzing security event information in accordance with an embodiment of the present invention.

Referring to FIG. 2, the security event collection block 121 real-time monitors security event logs of the respective network security systems 110 such as the IDS/IPS 112, the DDoS detection system 114, and the firewall 116, and periodically integrates the security event logs at a regular time interval to collect the security event information in step 202.

After that, the security event normalization block 123 normalizes the security event information collected by the security event collection block 121 using pre-defined standard formats and standard codes, and stores the normalized security event information in a memory region (not shown) in step 204. The security event information may include any of an attack type, an attack code, an attack destination, an attack cycle, a type of a detection system, a region where an attack took place, a service port, attack times by equipments, the number of packets, an attack volume, and a combination thereof.

Subsequently, the security event contraction block 125 analyzes the normalized security event information and categorizes and contracts the analyzed security event information to attack state information if a critical value of the analyzed information is greater than a predetermined reference value in step 206. The categorization and contraction of the normalized security event information is performed by categorizing the normalized security event information according to, e.g., attack types, attack codes, attack destination, attack cycles, detection equipments, regions where attacks took place, service ports, attack times by equipments, the number of packets, attack volumes, incoming outgoing IDs, the same time zone, and so on. Herein, each information that is categorized and contracted may be accumulated to the attack state information and additional information. The additional information may include cumulative information and detailed information for an attack state. The cumulative information may be summed up by regions where attacks took place and by detection equipments.

The visualization execution block 127 extracts the categorized and contracted visualization target data from the memory region in step 208, visualizes the extracted data as a 3D screen, and displays the 3D visualization screen on a display panel in step 210. Herein, the 3D visualization screen displayed on the display panel may include, as illustrated in FIG. 3, an attack information display region 302 where attack state information is displayed with a dome structure, a data update indicator 304, an electronic map display region 306, a detailed information display region 308 where detailed information for the attack state is displayed, and a cumulative information display region 310 where cumulative information summed up by regions where attacks took place and by detection equipments is displayed.

Therefore, the security manager may clearly recognize in real time the security state subdivided by departments in an organization, by regions where attacks took place, and by security equipments, through the use of the attack state information and the additional information displayed as the 3D screen on the display panel, and react to attacks in real time.

While the invention has been shown and described with respect to the preferred embodiments, the present invention is not limited thereto. It will be understood by those skilled in the art that various changes and modifications may be made without departing from the scope of the invention as defined in the following claims.

What is claimed is:
1. A method for visualizing a network security state, the method comprising:
collecting security event information from a network security system;

analyzing, executed by at least one computer, the security event information and extracting visualization target data corresponding to the security event information; and visualizing the visualization target data as a three-dimensional (3D) screen, and displaying the 3D screen on a display panel, wherein extracting the visualization target data comprises:
normalizing the security event information using predefined standard formats and standard codes;
analyzing the normalized security event information; and
categorizing and contracting, executed by at least one processor, the analyzed security event information to attack state information so as to extract the attack state information as the visualization target data, wherein the attack state information is categorized and contracted when a predetermined critical value applied thereto is greater than a predetermined reference value, and determined according to one of attack types, attack codes, attack destination, attack cycles, detection equipments, regions where attacks took place, service ports, attack times by equipments, the number of packets, attack volumes, and a combination thereof.

2. The method of claim 1, wherein the visualization target data comprises the attack state information and additional information for an attack state.

3. The method of claim 2, wherein the additional information comprises cumulative information and detailed information for the attack state.

4. The method of claim 3, wherein the cumulative information is accumulated by regions where attacks took place and by detection equipments, and displayed in the form of a bar graph expressing the cumulative information that is classified into an offensive side and a damaged side.

5. The method of claim 3, wherein the detailed information comprises data that is newly updated according to the movement of a data update indicator, the newly updated data being expressed in the form of a text box.

6. The method of claim 5, wherein the detailed information is displayed in the form of a pop-up when a mouse event is generated.

7. The method of claim 1, wherein the attack state information is displayed in the form of a structure that expresses an attack type and an attack target service port.

8. An apparatus for visualizing a network security state, the apparatus comprising:
a processor; and
a memory which stores a plurality of instructions, which when executed by the processor, cause the processor to execute:
collecting security event information from a network security system;
normalizing the security event information using pre-defined standard formats and standard codes;
analyzing the normalized security event information and categorizing and contracting the analyzed security event information to attack state information; and
extracting the attack state information as visualization target data, visualize the visualization target data as a three-dimensional (3D) screen, and display the 3D screen on a display panel, wherein the memory causes the processor to further execute categorizing and contracting the analyzed security event information to the attack state information when a predetermined critical value applied to the analyzed security event information is greater than a predetermined reference value, and the attack state information is determined according to one of attack types, attack codes, attack destination, attack cycles, detection equipments, regions where attacks took place, service ports, attack times by equipments, the number of packets, attack volumes, and a combination thereof.

9. The apparatus of claim 8, wherein the memory causes the processor to further execute categorizing detailed information and cumulative information for an attack event of the attack state information to additional information.

10. The apparatus of claim 9, wherein the memory causes the processor to further execute displaying the additional information, which is accumulated by regions where attacks took place and by detection equipments, on the display panel in the form of a bar graph expressing the additional information that is classified into an offensive side and a damaged side.

11. The apparatus of claim 9, wherein the memory causes the processor to further execute displaying data, which is newly updated according to the scan movement of a data update indicator, on the display panel in the form of a text box as the detailed information.

12. The apparatus of claim 11, wherein the memory causes the processor to further execute displaying the detailed information on the display panel in the form of a pop-up when a mouse event is generated.

13. The apparatus of claim 8, wherein the memory causes the processor to further execute displaying the attack state information on the display panel in the form of a structure that expresses an attack type and an attack target service port.

14. The apparatus of claim 8, wherein the network security system comprises one of an intrusion detection system (IDS), an intrusion prevention system (IPS), a DDoS detection system, a firewall, and a combination thereof.

* * * * *